(12) United States Patent
Massey et al.

(10) Patent No.: US 11,265,208 B1
(45) Date of Patent: Mar. 1, 2022

(54) DETECTING PATH FAULTS IN PARALLEL REDUNDANCY PROTOCOL COMMUNICATIONS

(71) Applicant: Honeywell International Inc., Morris Plains, NJ (US)

(72) Inventors: W. Russell Massey, Levittown, PA (US); James Michael Schreder, Perkasie, PA (US); Harshal S. Haridas, Jamison, PA (US); Joseph Pradeep Felix, Phoenixville, PA (US); Jay William Gustin, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/137,035

(22) Filed: Dec. 29, 2020

(51) Int. Cl.
*H04L 12/24* (2006.01)
*H04L 41/0654* (2022.01)
*H04L 43/0805* (2022.01)

(52) U.S. Cl.
CPC ...... *H04L 41/0654* (2013.01); *H04L 43/0805* (2013.01)

(58) Field of Classification Search
CPC . H04L 41/0654; H04L 41/0677; H04L 41/06; H04L 41/0618; H04L 41/0622; H04L 41/0695; H04L 43/0805; H04L 43/022; H04L 43/04; H04L 43/0823; H04L 43/0835; H04L 45/22; H04L 45/24; H04L 45/7453; H04L 47/56; H04L 49/9089; H04L 49/552; H04L 61/2596; H04L 69/40; H04L 12/40176; H04L 12/40189; H04L 12/2801; H04L 12/2854; H04W 24/08; H04W 24/04
See application file for complete search history.

(56) References Cited

U.S. PATENT DOCUMENTS 9,407,582 B2   8/2016  Angst et al.
10,044,644 B2  8/2018  Ma
(Continued)

FOREIGN PATENT DOCUMENTS

EP   3629550 A1   4/2020

*Primary Examiner* — Jeffrey M Rutkowski
*Assistant Examiner* — Sudesh M Patidar
(74) *Attorney, Agent, or Firm* — John Maldjian; Stevens & Lee PC

(57) ABSTRACT

An electronic device and other electronic device include a first and second port that utilizes a parallel redundancy protocol in a communications network including a first and second lane. The devices include a processing circuit, a PRP handler, a protocol stack, a memory, permanent storage accessible by the processing circuit, and transmit and receive circuitry for transmitting and receiving packets. A redundancy manager is for identifying path faults in the network. The processing circuit implements a method of detecting network path fault, including the other electronic device transmitting a frame pair over the first lane and second lane. The electronic device receives the frame pair and implements a receive processing flow, when the first frame or the second frame is identified to be a redundant frame, removes the redundant frame, and compares a first frame parameter to a second frame parameter to determine when the path fault is present.

12 Claims, 7 Drawing Sheets

(56) References Cited

U.S. PATENT DOCUMENTS

| | | | |
|---|---|---|---|
| 2007/0223533 A1* | 9/2007 | Kirrmann | H04L 41/0659 370/469 |
| 2011/0029687 A1* | 2/2011 | Kirrmann | H04L 12/437 709/236 |
| 2011/0116508 A1* | 5/2011 | Kirrmann | H04L 12/437 370/392 |
| 2013/0223204 A1* | 8/2013 | Angst | H04L 41/0668 370/218 |
| 2015/0295635 A1* | 10/2015 | Koskiahde | H04B 7/15542 370/315 |
| 2017/0195260 A1* | 7/2017 | Ma | H04L 69/40 |
| 2018/0351702 A1* | 12/2018 | Heer | H04L 1/22 |
| 2019/0305900 A1* | 10/2019 | Kaattari | H04L 45/24 |
| 2020/0033840 A1* | 1/2020 | Balasubramanian | G05B 9/03 |

* cited by examiner

DETECTING PATH FAULTS IN PARALLEL REDUNDANCY PROTOCOL COMMUNICATIONS

FIELD

Disclosed aspects relate to network communications using a parallel redundancy protocol, such as for network communications within a process control system.

BACKGROUND

The Parallel Redundancy Protocol (PRP) standard, IEC-62439-3T, which is commercially available, which includes the High-availability Seamless Protocol (HSR), provides redundant communications where the same data is sent over 2 (or more) different paths sometimes called lanes. The Ethernet frame for both PRP and HSR is the same but the application is different. HSR is implemented with the nodes configured in a ring where the frames are sent in each direction, while PRP is implemented with nodes in parallel networks where the frames are sent over two independent but parallel networks.

The PRP parallelism provided ensures no communication interruption on a single fault or some combinations of faults. One of the ports on any node can fail without disrupting the system, or in the case of a system supporting nodes having PRP devices and Ethernet devices, one Ethernet switch may fail without disrupting the system.

With Ethernet communications commonly used in process control systems (PCSs), this means dual interfaces and parallel switch trees. To ease the needed duplicate (redundant) frame rejection, electronic devices generally referred to as being nodes in the PRP network, commonly referred to as PRP nodes which have first and second ports, append in a PRP redundancy control trailer (RCT) to the frame fields including a sequence number (sometimes referred to as a serial number), a lane indicator generally referred to as a port identification (port ID; for 2 ports there may be a first port that may use a first lane and a second port that may use a second lane), a frame size, and a PRP suffix that allows a receiving device to determine that the frame belongs to the PRP. This RCT to the frame is invisible to the higher layers of the receiving node (it is considered as padding). Receivers discard redundant (or duplicate) frames using a variety of known methods.

The sender (transmitting node) inserts the same sequence number into both frames of a frame pair that is transmitted from both of the ports over the respective lanes, and increments the sequence number by one for each frame sent. The receiver keeps track of the sequence number for each, and for each source address that generally comprises a source media access control (MAC) address it receives frames from. The second (later received) frame received having the same source address and sequence number as the first frame of the frame pair coming from either of the respective lanes is ignored (or discarded).

While intelligent Ethernet switches can detect and report when devices disconnect from the network, such as using Simple Network Management Protocol, PRP itself does not provide path fault detection. As a result, until there are significant number of faults, no path fault issue can be detected by the application(s) using PRP communications running in the network.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem that commercially available PRP packages do not provide path fault diagnostics. With conventional PRP there is thus no communication path fault warning until after multiple path faults have taken place which break the communications, which is generally too late for certain systems such as a PCS which is known to include time-sensitive situations. Disclosed aspects include new techniques for fault detection for a PRP-based communication network, and includes the option of issuing an alert responsive to detecting the first occurrence of a communication path fault in the network. The issuance of an alert is recognized to be important for systems such as a PCS to enable performing timely corrective maintenance, or for changing a process parameter setting before the situation in question becomes critical (e.g., because of safety concerns).

One disclosed aspect comprises an electronic device and at least one other electronic device in a communications network including a first and second lane, where the electronic devices each include a first port that utilizes the first lane and a second port that utilizes the second lane, and the protocol utilized is PRP. The electronic devices include a processing circuit including or associated with a PRP handler, a protocol stack, a memory and permanent storage accessible by the processing circuit, and transmit and receive circuitry for transmitting and receiving data packets. A redundancy manager generally implemented in the memory of the electronic device is for identifying path faults in the network.

The processing circuit implements a method of detecting a network path fault, the method including the other electronic device transmitting a frame pair with a first frame transmitted over the first lane and a second frame transmitted over the second lane. The electronic device receives the frames of the frame pair and implements a receive processing flow. The receive processing flow comprises when the first frame or the second frame is identified to be a redundant frame, the redundant frame is removed. A first frame parameter that is compared to a second frame parameter to determine when the path fault is present.

Disclosed aspects methods provide detection of communication path faults for networks implementing at least PRP communications, with the option for implementing PRP with fault-tolerant Ethernet communications, all with almost no additional overhead. Disclosed aspects can also include an early warning of the path fault that enables proper corrective action to be taken.

DETAILED DESCRIPTION

Figure 1A:
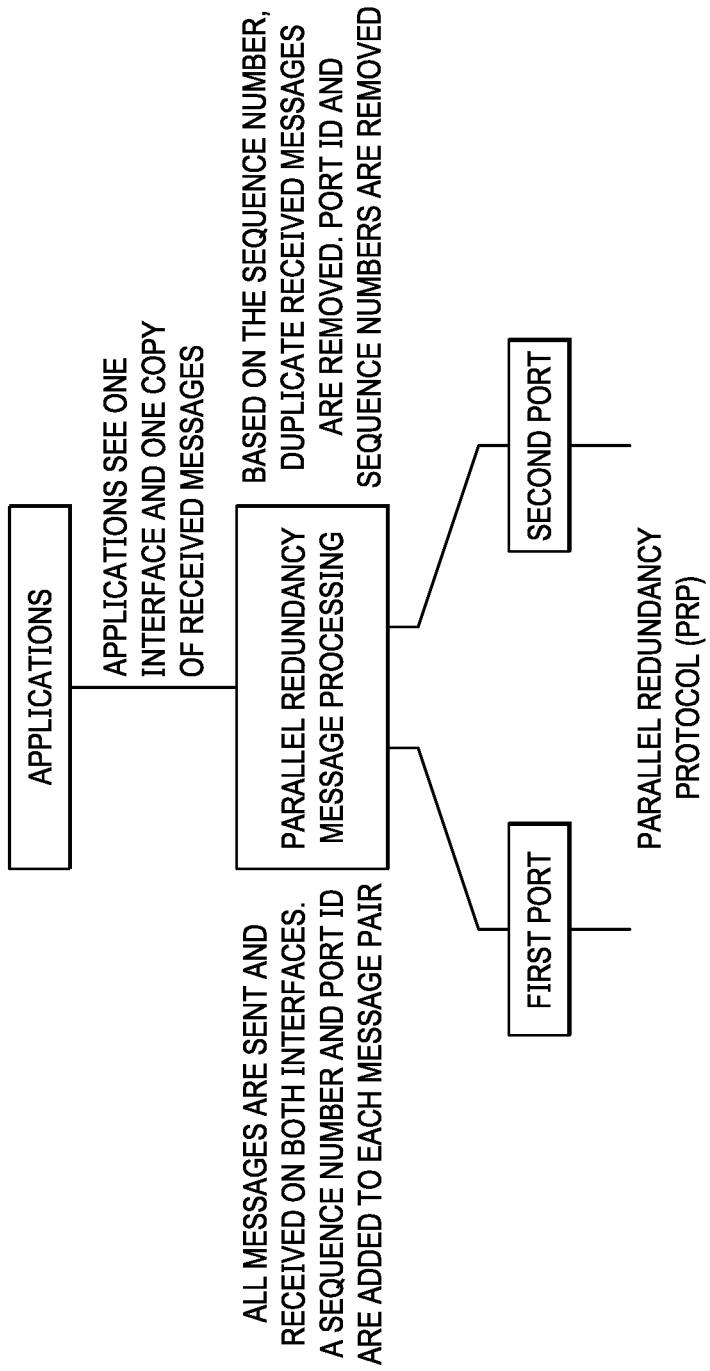
FIG. 1A shows aspects of known PRP communications, with two of its features shown, being the port ID and sequence number included in the frames of the frame pairs that are transmitted, where the duplicate frame rejection on the receive side is a feature that can be used as one component for a disclosed first method of path fault diagnostics.

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

For disclosed aspects applied in an example application to PCS's, as used herein a PCS runs an industrial process involving a tangible material that disclosed aspects apply. For example, oil and gas, chemical, beverage, pharmaceutical, pulp and paper manufacturing, petroleum processes, electrical power including renewable energy, and water. An industrial process facility is thus clearly distinct from a data processing system that only performs data manipulations.

Honeywell Fault Tolerant Ethernet (IEC 62439-4 Coupled Redundancy Protocol) is an example of fault-tolerant Ethernet which represents one way of implementing a robust multi-fault tolerant communications network, but its fault recovery time is generally too long from some high-speed applications. Such high-speed applications include applications for power substations, and in the case of a PCS, for components such as synchronized drives, valves, and actuators. PRP, which includes the related ring-based High-availability Seamless Protocol (HSR) that are both considered to be PRP herein, are both redundant protocols being defined under IEC-62439-3T, that use a common duplicate frame structure but different topologies for providing protection against a single communication fault. These protocols may both be implemented in software or within a device as hardware (HW) implemented logic, for example as an application-specific integrated circuit (ASIC) or a Field Programmable Gate Array (FPGA). Advantages of HW being used for protocol implementation include less processor load, in most cases being faster as compared to a software implementation, and in the case of a HW implementation, the HW logic can be run in parallel with software to further increase the speed.

Usually, such HW device implementations for protocols have limited resources and cannot provide much in the way of fault diagnostics. One such supplier discloses configuring the device to be in a transparent mode periodically so that its software can track every frame received from any of the devices in the network. When data traffic is heavy, this may add an unsupportable central processing unit (CPU) load. The disclosed first method of tracking of the difference (in count/number) between duplicate frames that are rejected and the expected duplicate frames is recognized to be a low-overhead and early warning system for identifying a single PRP fault. This early fault warning/reporting to a system operator can trigger maintenance to promptly resolve the fault.

For this disclosed fault identification approach to be practical, all devices using the HSR or PRP the frame structure should generally have the same number of ports, that as described above generally 2 ports for PRP and exactly 2 ports for HSR. Two methods are described below comprising a diagnostic for fault detection and reporting on PRP, and additional fault detection and reporting when PRP is used together with FTE.

FIG. 1A shows aspects of PRP communications, with two of its features shown, being the port ID as noted above to be within the RCT of the frame, included in the frame pairs that are transmitted and duplicate frame rejection on the receive side, that can both be used for disclosed fault diagnostics for PRP. As shown in FIG. 1A all frames are sent and received on both electronic device ports shown as the first port and the second port, along with a sequence number and port ID, both being part of the RCT, which are added to the first and second frames of each frame pair, where the first frame is then transmitted by the first port and the second frame is then transmitted by the second port. On the receive side, based on the sequence number and source address in the receive frames, duplicate frames are removed. The PRP suffix is also removed from the frame before providing the frame to the application (or IP stack). The application(s) running on the electronic device thus see only the frame transmitted from one port, and thus only one copy of the receive frame.

It is now described how to use the duplicate rejection feature of the first disclosed method as a disclosed path fault diagnostic. As described above, PRP provides redundant communications through parallel networks (independent paths), so each device has two ports that transmit the same frame at the same time. This parallelism means there is no communication interruption in the event of a single fault or some combinations of faults. When PRP is used on Ethernet, this implementation uses dual-ports and parallel Ethernet switch trees. While intelligent Ethernet switches can detect and report on devices disconnecting (through Simple Network Management Protocol), PRP itself does not provide path fault detection until as described above, there is a significant number of faults so that no path fault problem can be observed by the application(s) running on a device.

The frame structure of HSR and PRP provides two features recognized herein to be capable to be used for path fault diagnostics. Using the Port ID in each frame enables a receiver to identify the port from which the frame was transmitted. With PRP, if one port (say the first port for any of the network devices that communicate on first lane) receives a frame with the ID of another port (say the second port for any of the network devices that communicate on the second), this means the independent network paths (the first lane and the second lane) are connected, and therefore the HSR or PRP network robustness is thus compromised. In the case of HSR, this results in the improper ordering of ring ports (out to in).

Regarding the duplicate frame rejection feature, each frame is transmitted out a device from multiple ports, generally being two ports shown as a first port and as a second port in FIG. 1A, with the same sequence number provided in the frame frames transmitted out of the respective ports. The rejection feature operable on the receive end enables PRP to be transparent to the application for blocking duplicate traffic from reaching the application so that the application only sees one copy of the receive frame.

Disclosed aspects include a first method that takes advantage of the duplicate frame rejection provided by conventional PRP to provide an early warning of PRP path faults, by adding a new counting of the unique received frames. For a properly working PRP, these respective counts should be equal to one another, so that there should be no missing duplicates. Any difference in these counts is recognized to be a potential indication of a path fault because, in a real system, there is always the possibility of random frame loss. One can alarm responsive to an increasing number of missing duplicates and return to normal when the increase in the number of missing duplicates stops. The increase in the number of missing duplicates will stop when the path fault is repaired, or a device causing the problem is shut down. It is possible that a device in the process of shutting down or failing may cause one or two missed duplicates, so that a small amount of filtering or hysteresis described in the paragraph below may be used to help prevent false alarms.

For example, a low missing duplicate rate, such as one or two missing duplicates per minute, can generally be ignored because this may not be an indication of a port/path failure. When the missing duplicate rate drops from a high rate to a low rate, that rate dropping can be used as an indication of a restoration. To prevent unnecessary fault notifications, in one example the alarm associated with detection of the path fault is not cleared until a predetermined amount of time, such as a full minute, remains at a low missing duplicate rate.

Figure 1B:
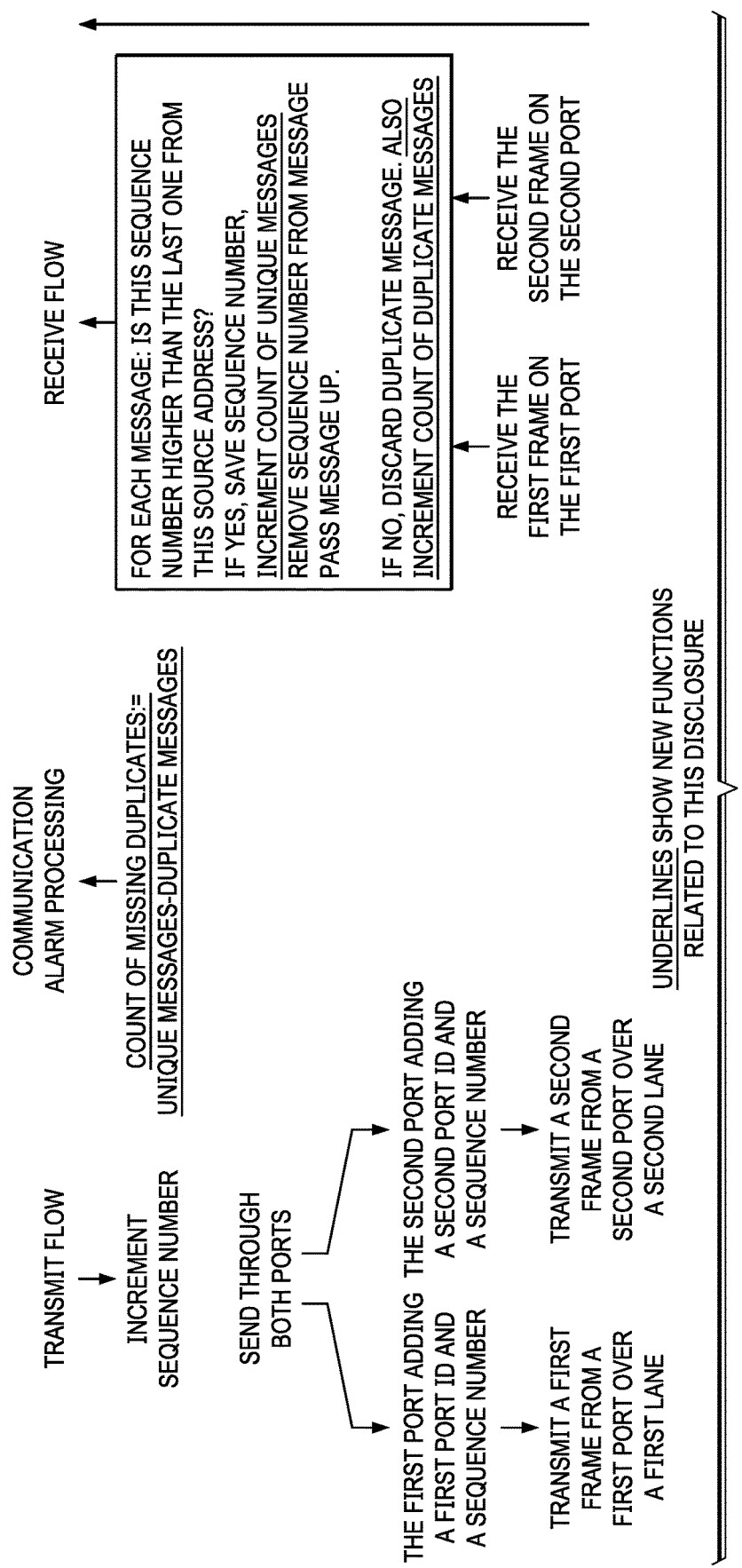
FIG. 1B shows an example PRP data flow comprising in the leftmost column a transmit flow, and a receive flow in the rightmost column, where some text is underlined in the receive flow to emphasize new functions related to the first disclosed method of path fault diagnostics comprising identifying a single path fault.

FIG. 1B shows an example PRP data flow comprising in the leftmost column a transmit flow, and a receipt flow in the rightmost column, where some text is shown underlined in the receive flow to emphasize some new functions related to the first disclosed method which enables identifying a single path fault. These new features are shown underlined which comprise checking after receiving the first frame over the first lane on the first port and the second frame over the second lane on the second port whether the sequence number is higher than the last one received from the same source address. If yes, the counter sequence number is saved, and the count of unique frames is incremented. The RCT including the counter sequence number is removed from the frame, and the frame is passed up to the application (to the IP stack).

If the counter sequence number is not higher than the last counter sequence number from this same source address, the frame is determined to be a duplicate frame, where the duplicate frame is discarded. The count of duplicate frames is incremented. A disclosed count of missing duplicates relating to the first disclosed method is then found by comparing the number of unique frames to the number of duplicate frames. The additional small overhead to implement the first disclosed method is the small per frame overhead in the new feature of counting missing duplicate frames rather than just conventionally ignoring them. Moreover, this first disclosed method provides full compatibility with the PRP standard.

As described below, included in this Disclosure is also a second related method that involves detecting multiple path faults, that is described in detail below relating to method 400. This second method involves the redundancy manager (see the redundancy manager 209 shown for the intelligent electronic device 200 in FIG. 2 described below) further implementing a status check, where the network utilizes a protocol other than the PRP, such as a fault-tolerant Ethernet protocol. There is also only an additional small overhead to implement this second disclosed method mainly relating to implementing a disclosed status check.

Figure 2:
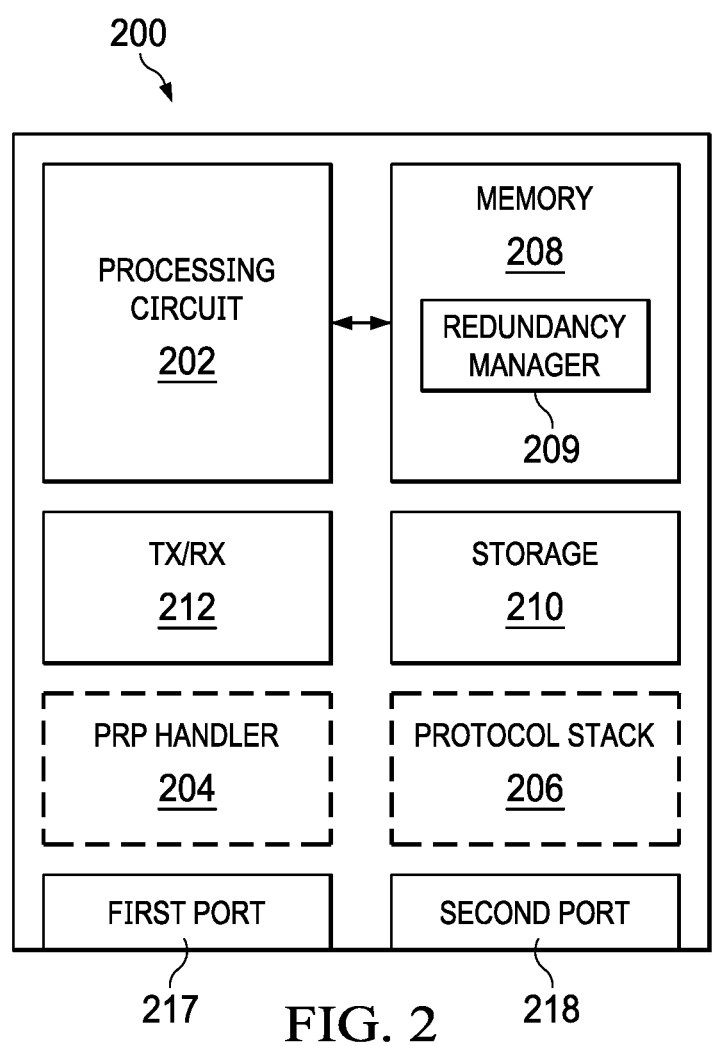
FIG. 2 is a block diagram of an example electronic device for implementing PRP over a communications network, that includes a disclosed a redundancy manager for implementing a receive processing flow for identifying a path fault(s) in the communications network.

FIG. 2 illustrates a block diagram for an intelligent electronic device 200 for use in a system that employs the PRP standard that can be used with the disclosed aspects. In one embodiment, at least one of the intelligent electronic device 200 is included in a PCS. The intelligent electronic device 200 includes a first port 217 and a second port 218, where the intelligent electronic device 200 is configured to communicate with a remote supervisory control and data acquisition (SCADA) system or a distributed control system (DCS) that interfaces with the PCS. Packet data transmitted from the intelligent electronic device 200 to the SCADA or DCS includes data measured, processed and/or received by the intelligent electronic device 200.

In general, the intelligent electronic device 200 includes a processing circuit 202 which can include digital and/or analog circuitry, such as one or more controllers, processors, ASICs (application-specific integrated circuits), for executing program code which implements the functionality of the electronic device, including the PRP-related functions described herein. To this end, the processing circuit 202 includes or is associated with a PRP handler 204 for constructing PRP frames and implementing PRP-related functions and a protocol stack 206 for implementing different layers of packet-based communication at the intelligent electronic device 200. As such, the boxes for PRP handler 204 and protocol stack 206 in FIG. 2 are illustrated as dashed boxes (rectangles).

In one case, the protocol stack 206 can implement the hypertext transfer protocol (HTTP) at the application layer, transmission control protocol (TCP) at the transport layer, IP (Internet protocol) at the Internet/network layer, Ethernet at the data link/link layer, and IEEE 802.3u (wired) or the IEEE 802.11 (wireless) standard at the physical layer. These protocol layer examples are to be considered non-limiting and are merely illustrative of the types of communication protocols which can be implemented by the protocol stack 206.

The intelligent electronic device 200 also includes volatile and/or nonvolatile memory 208, such as dynamic random access memory (DRAM), FLASH memory, and permanent storage 210 shown as storage, such as a hard disk drive (HDD) and/or an optical drive for storing program code and related data processed and accessed by the processing circuit 202 during execution of the program code. A disclosed redundancy manager 209 is shown implemented by the processing circuit 202 interacting with code in the memory 208. The redundancy manager 209 implements a disclosed receive processing flow for identifying at least one path fault in the communications network, and can also implement the status check used for the second disclosed method which involves detecting a plurality of path faults. The intelligent electronic device 200 also has transmit and receive (TX/RX) circuitry 212 for transmitting data packets constructed by the PRP handler 204 in conjunction with the protocol stack 206, and for receiving data packets for processing by the PRP handler 204 and the protocol stack 206.

Figure 3:
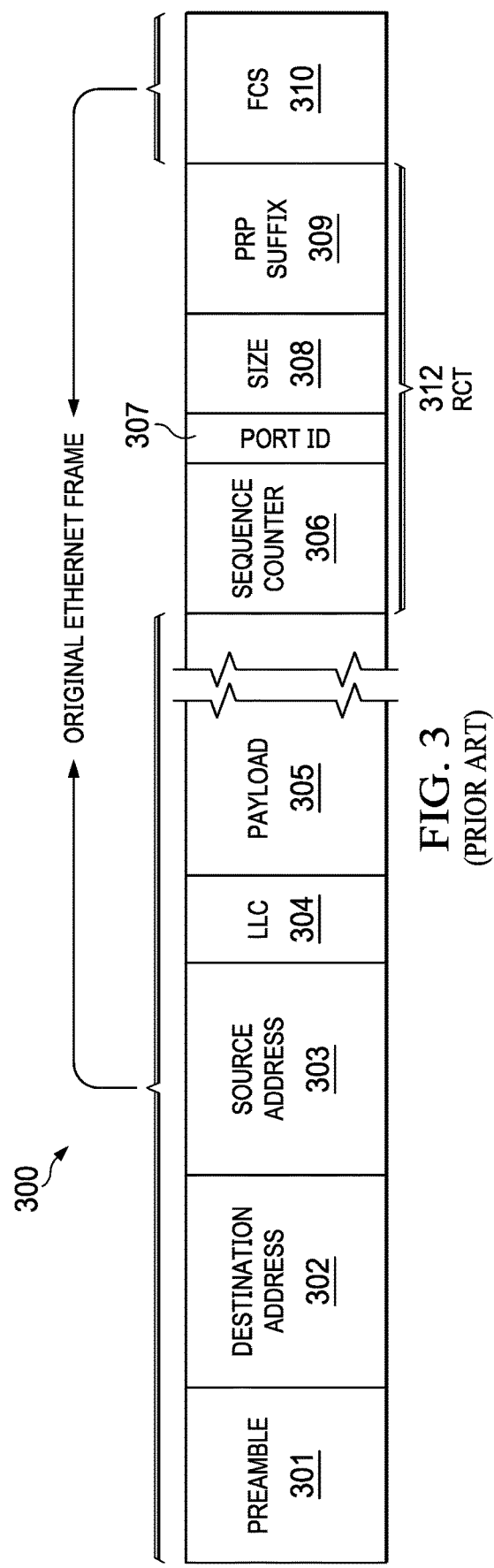
FIG. 3 is a block diagram of an example PRP frame that can be used to implement disclosed aspects. The RCT includes a sequence counter and a port ID, such as for identifying the port as being from the first port or the second port.

FIG. 3 is a block diagram of an example PRP frame 300 that can be used to implement disclosed aspects. PRP frame 300 includes a preamble 301, a destination address 302, a source address 303, a logical Link control (LLC) 304, and a payload 305. PRP frame 300 also includes an RCT 312 and then a frame check sequence (FCS) 310. The RCT 312 includes a sequence counter 306, a port ID 307, a size 308, and a PRP suffix 309. As noted above the port ID 307 is used for identifying the port from which the frame is transmitted (e.g., from the first port or from the second port).

Regarding using FTE status for additional PRP fault determination, when the system loses network communications from one node to one or more other nodes, one wants to take the action most likely to restore communications and/or proper system operation. In the case of redundant devices, switching primary operation to a backup device that has full view (full view meaning when one device can see other devices on the network and one device cannot, the better device assumes the primary role) is recognized to be a best solution to the loss of network communication. In addition to control functions, in the case of a plurality of process controllers configured to implement an orchestration function, one should also handle recovery of the orchestrator function which has one master and multiple monitor controllers.

In this arrangement, the PRP system is built on fault-tolerant Ethernet such as the Honeywell International's Fault Tolerant Ethernet (FTE), which in one particular example that may have a two-second single-fault recovery. A fault-tolerant Ethernet such as FTE can also maintain communications in some cases of multiple faults. Due to using a crossover between two networks, FTE provides four possible paths between any two nodes, A and B: A->A, B->B, A->B, B->A. Each FTE node generally maintains a table having the status of each of the four paths to every other FTE node. As an example, Honeywell International's EXPERION redundancy will cause a switchover to a backup device if the primary device loses all communications. If redundancy determines that a switchover will not restore connectivity, it will not switchover.

On top of the two FTE parallel switch tree paths but not using the crossover capability, PRP is single-fault tolerant, so that no fault recovery is needed. When a loss of communications does occur, typically as determined by a timeout, a node can use its local FTE path information to determine its action. If FTE reports at least one valid path to that node, then the problem is limited to PRP. This PRP fault condition will generally be alarmed.

Regarding redundant functionality in the case of process controllers, and the specific case of Honeywell International' Orchestrator on Highly Integrated Virtual Environment (HIVE) controllers is different from traditional process controller redundancy. This is because HIVE controllers are not redundant, but instead the multiple HIVE control applications deployed on it are instead redundant. When a controller switchover is needed, HIVE control applications are configured for independently and individually switching over to a backup.

Orchestrator functionality exists in all HIVE controllers, one orchestrator instance is the Master controller and the other controllers are Monitor controllers. When the monitors do not 'see' their Master controller, they attempt to assume the master controller role. Among orchestrators that can communicate, the monitor controller with the lowest hardware index value can become the Master controller. When one Orchestrator cannot see all others, the result can be multiple Master controllers. This is a situation to generally be avoided or minimized that should be also be alarmed. The system operator should be notified of PRP path errors and also abnormal Orchestrator situations so that maintenance can restore proper communications. Alarms and notifications are sent via FTE, which generally has more opportunities for success.

As noted above, PRP transmits the same frame where the communications unit (of an electronic device) can be configured for a wireless connection or a cable connection on multiple ports each on its own lane, with an appended sequence counter number. The sequence counter number is incremented before transmitting each frame, so that the source address added to the sequence counter number provides a unique pair. As described above, the source address is unique so the sequence number maintained in each device when combined with the source address is therefore unique. All receiver nodes use the sequence number they receive from the frame received to remove duplicate frames before passing up the stack to their application.

Figure 4:
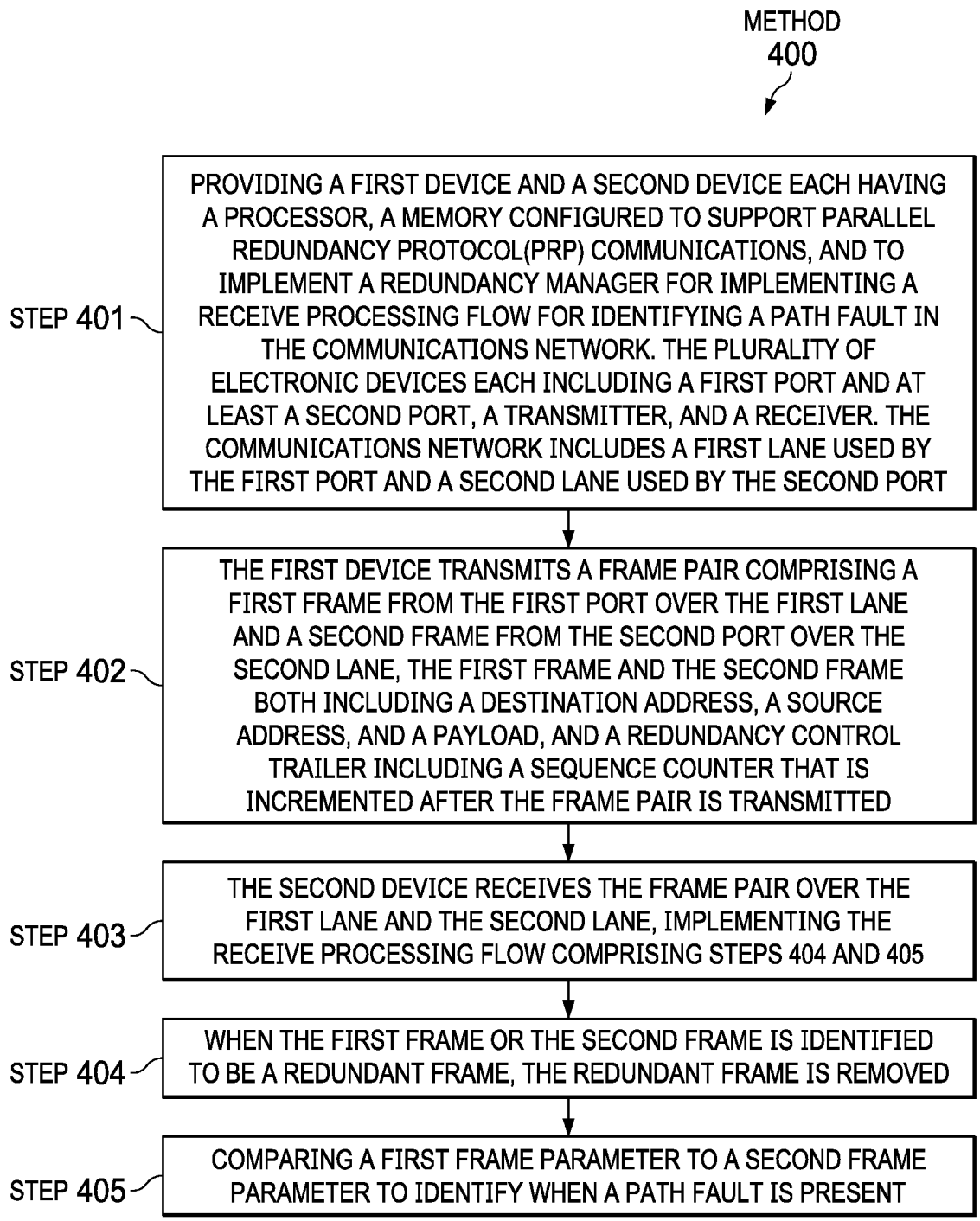
FIG. 4 is a flow chart that shows steps in a method of detecting and reporting path faults for a PRP-based communications network, according to an example aspect.

FIG. 4 is a flow chart that shows steps in a method 400 of detecting and reporting path faults problems for a PRP-based communications network, according to an example aspect. Step 401 comprises providing a first device and a second device each having a processor, a memory configured to support the PRP communications, and to implement a redundancy manager for implementing a receive processing flow for identifying a path fault in the communications network. The plurality of electronic devices each include a first port and at least a second port, a transmitter, and a receiver. The communications network includes a first lane used by the first port and a second lane used by the second port.

Step 402 comprises the first device transmitting a frame pair comprising a first frame over the first lane and a second frame over the second lane, the first frame and the second frame both including a destination address, a source address, and a payload, and an RCT including a sequence counter that is incremented after the frame pair is transmitted. Step 403 comprises the second device receiving the frame pair over the first lane and the second lane and implementing the receive processing flow, comprising steps 404 and 405 described below. Step 404 comprises when the first frame or the second frame is identified to be a redundant frame, removing the redundant frame. Step 405 comprises comparing a first frame parameter to a second frame parameter that is different from the first frame parameter.

A first disclosed method is for identifying a single path fault, such as in a PRP network. In this first method, following the removing of the redundant frame (step 404), only one of the first frame and the second frame is added to generate a unique frame count. In this first disclosed method, the first frame parameter comprises the unique frame count and the second frame parameter comprises a count of the redundant frames to determine whether there is a count difference.

The unique frame count received and redundant frame count (equal to duplicates removed) is thus the basis for disclosed path fault diagnostic in this disclosed first method. Any difference between these respective counts for a properly operating communications system is an indication of a path fault problem. This difference will continue to increase as long as a path fault problem persists.

In a second disclosed method, which is for identifying a plurality of path faults, the redundancy manager further implements a status check utilizing a protocol other than the PRP (a non-PRP protocol, such as a fault-tolerant ethernet protocol). This second method comprises the first device transmitting the frame pair as a port status frame pair comprising the first frame as a first port status frame including the status check of the first port over the first lane, and the second frame as a second port status frame including the status check of the second port over the second lane. The first port and the second port are allowed to cross over between the first lane and the second lane without being rejected by receiving logic implemented by the receiver. The second device receiving (step 403) comprises receiving a first copy of the port status frame pair over the first lane and a second copy of the port status frame pair over the second lane, and implementing a port status availability matrix from the first and second copies of the port status frame pair.

The port status available matrix comprises wherein the first port status frame is the first frame parameter is received over the first lane and the first port status frame is received over the second lane indicates a path availability from the first lane on the first device to the first and the second lanes on the second device, and the second port status frame is the second frame parameter is received over the first lane and the second port status frame is received over second lane indicates a path availability from second lane on first device to the first and the second lanes on the second device. The comparing (step 405) in this second disclosed method comprises comparing the first port status frame received (as the first parameter) and second port status frame received (as the second parameter) to determine whether there is a difference to identify the plurality of path faults when present.

The method 400 can further comprise responsive to the path fault, transmitting an alert message to an operator(s) and the maintenance journal, to enable corrective action be taken. Because a device entering or leaving the communications network may cause a discrepancy, some filtering may be used at that time to prevent false alarms. Although filtering is not required, it is generally helpful because there is always the possibility of a transient traffic overload causing a frame loss. The communications network after an alarm and possible corrective action can then return to normal when the count difference stops increasing.

The RCT can further comprises a port identification and a lane indicator including a first port identification and a first lane indicator for the first frame and a second port identification and a second lane indicator for the second frame. In this arrangement the identifying of the redundant frame can comprise comparing the source address and the sequence counter number to determine the source address and the sequence counter number are both the same for the first frame and for the second frame.

The communications network can be within a PCS (see PCS 500 and FIG. 5A described below) that comprises at least one operator workstation, at least one process controller coupled to at least one I/O module, where the I/O module is coupled to at least one field device that is coupled to at least one piece of processing equipment. The PRP can comprise HSR protocol, and in this arrangement, the plurality of electronic devices is arranged as a ring in the communications network.

The first method can further comprise when the count difference is determined to be increasing over time, identifying when the path fault is present using a predetermined measurement period for the time utilized. In the communications network PRP can be used together with a fault-tolerant ethernet protocol.

Figure 5A:
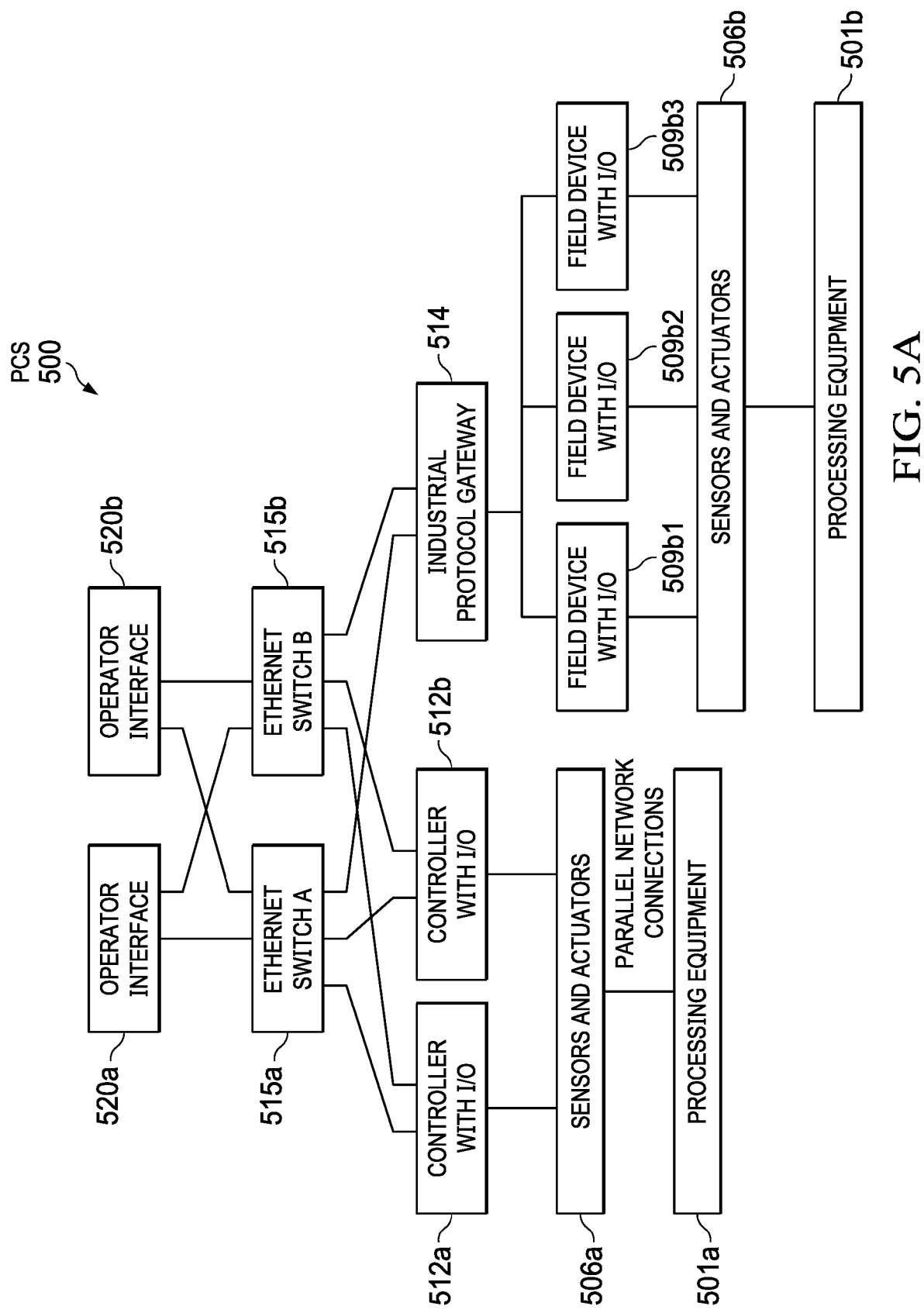
FIG. 5A shows a block diagram representation of a PCS that can implement PRP communications and thus utilize disclosed aspects This example PCS shows how parallel networks can be used in an industrial setting. Generally, any device with a processor, transceiver, and two ports can be used for PRP communications.

FIG. 5A shows a block diagram representation of a PCS 500 that can implement PRP communications shown including operator interfaces 520a and 520b coupled by Ethernet switches 515a and 515b to controllers 512a and 512b, shown optionally also having IOs, and an industrial protocol gateway 514. The controllers 512a and 512b are shown having I/O's that are coupled to sensors and actuators 506a, which are coupled to processing equipment 501a. The industrial protocol gateway 514 is shown coupled by field devices with I/O 509b1, 509b2, and 509b3, which are coupled by sensors and actuators 506b to processing equipment 501b. This example PCS 500 shows how parallel networks can be used in industrial setting. Generally, any kind of device with a processor, transceiver, and two ports (also known as interfaces) can be used for PRP communications.

Figure 5B:
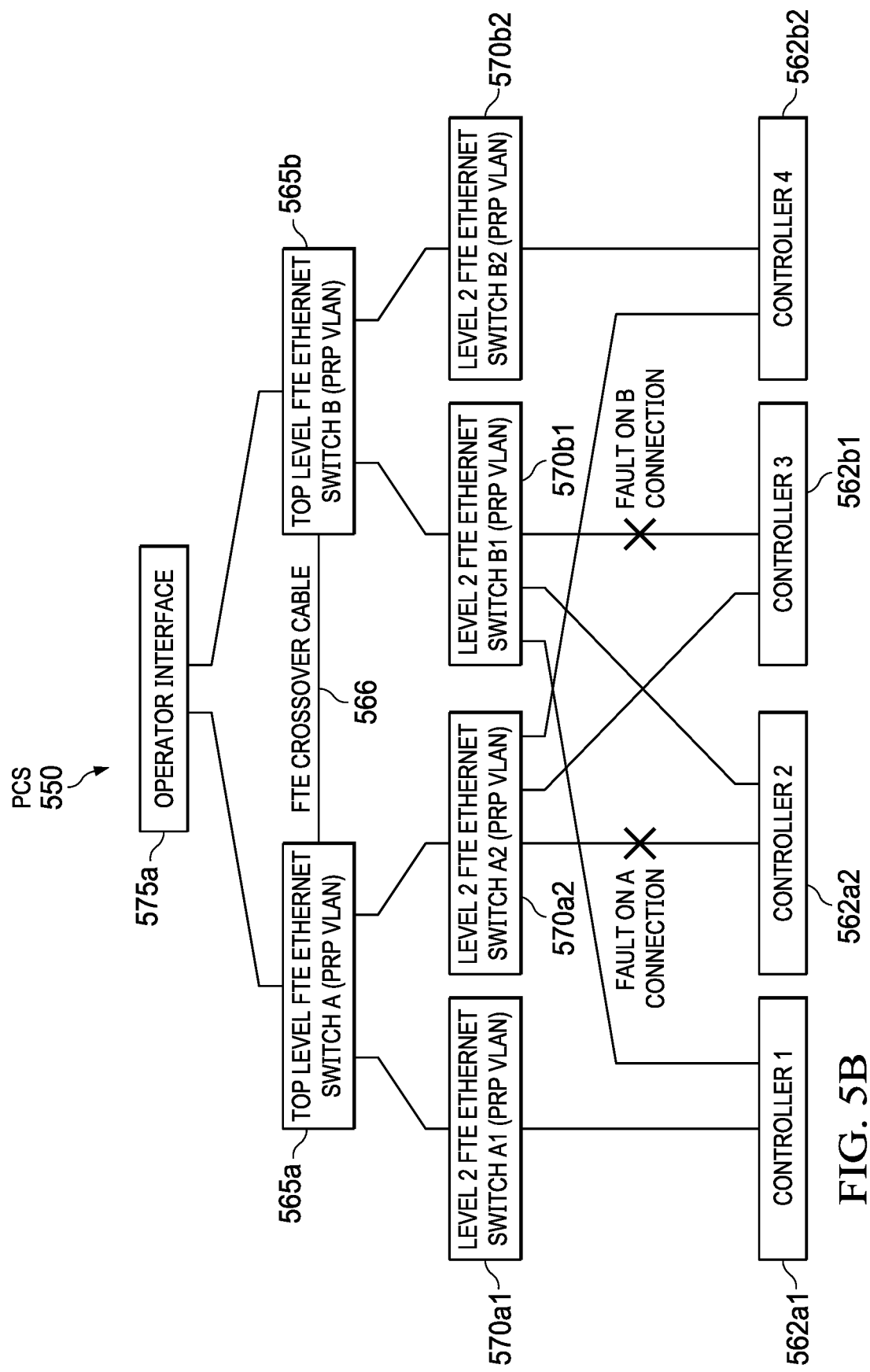
FIG. 5B shows a block diagram representation of a PCS showing an example of dual-fault breaking (each break shown as an X) of PRP connectivity between controllers and their connection to switches. Due to a crossover to FTE following the PRP path fault, FTE connectivity remains between these controllers.

FIG. 5B shows a block diagram representation of a PCS 550 showing an example of dual fault breaking (shown as X) PRP connectivity between controllers and their connection to switches shown implementing a crossover to FTE following the PRP path fault, so that FTE connectivity remains between these controllers. The PCS 550 is shown including operator interface 575a coupled to FTE Ethernet switch A 565a and to FTE Ethernet switch B 565b. There is an FTE crossover cable 566 shown connecting the top level FTE Ethernet switch A 565a to the top level FTE Ethernet switch B 565b. The top level FTE Ethernet switch A 565a is connected to a level 2 FTE switch A1 570a1 and to a level 2 FTE switch A2 570a2. The top level FTE Ethernet switch B 565b is connected to a level 2 FTE switch B1 570b1 and to a level 2 FTE switch B2 570b2. The PCS 550 is also shown including four process controllers shown as controller 1 562a1, controller 2 562a2, controller 3 562b1, and controller 4 562b2.

Controller 1 562a1 is shown coupled to the level 2 FTE switch 570a1, and level FTE switch B1 570b1. Controller 2 562a2 is shown coupled to the level FTE switch 570a2 but with a fault on its connection, and the level 2 FTE switch B1 570b1. Controller 3 562b1 is shown coupled to level 2 FTE switch 570a2, and to level FTE switch B1 570b1, but with a fault on its connection. Controller 4 562b2 is shown coupled to the level FTE switch A2 570a2, and to the level 2 FTE switch B2 570b2.

Applied to a PCS such as PCS 550, such as for the Honeywell International EXPERION PKS R520, for implementing a control HIVE, PRP can be added to FTE to make time-critical communications more robust against faults as compared to traditional FTE alone. The specific Honeywell International products, for example, can include process controllers comprising the C300, UOC, CN100, and operator workstation that have process controller software that generally run on a virtual machine host.

EXAMPLES

Disclosed aspects are further illustrated by the following specific Examples, which should not be construed as limiting the scope or content of this Disclosure in any way.

In one example application scenario for a PCS, multiple Honeywell C300H process controllers are connected to the same Honeywell International' FTE switches and there is a dual-fault situation where a first cable on C300H-1 (assume it being the Master Orchestrator in the network) is disconnected and a second cable on another controller C300H-2 (a Monitor controller) is disconnected. There is an issue in this situation because there is now no PRP path between orchestrators deployed on C300H-1 and C300H-2, so that the C300H-2 may decide to take over as the master orchestrator depending on its hardware device index. The result will generally be multiple master orchestrators in the PCS.

A solution when a HIVE controller (not the master controller) cannot reach the Master controller is the HIVE controller can check with FTE for availability of the node based on last known MASTER device index, and a plurality of slaves. If a master controller becomes inoperable is invisible through the PRP, one slave controller can be promoted, such as by promoting of the lowest device index, and switches on the FTE index to the Master Orchestrator can be provided to FTE so that it can return a 4-path status result for paths A->A, A->B, B->A and B->B. If any one of these 4 communication paths is operational, the C300H-2 should generally report a lonely status alarm (isolated, unable to reach the Master controller) and take appropriate actions (or inactions). Regarding actions, the orchestrator on an affected node can command primary HIVE Control Applications (HCAs). This is software that run on the process controllers that generally does need access to the I/O modules to switch to a backup, or shut them down so a backup can take over.

What is now described is an example showing detecting a path fault for a generic PRP-based PCS. There are cases of dual-fault situations in systems supporting both PRP devices and FTE devices, and devices that support both PRP and FTE, where two devices have no connectivity through PRP, but can still have connectivity through FTE. The PCS corresponding to this example is shown as PCS 550 in FIG. 5B described above. In this case the first port of Controller 2 562*a*2's connection to the level 2 FTE switch A2 570*a*2 is broken and the second port of Controller 3 562*b* 1's connection to the level 2 Ethernet switch 570*b*1 is broken. If Controller 2 562*a*1 and controller 3 562*b*1 had the lowest device hardware (HW) device indexes, they can then agree on which controller takes on the Master role. When these controllers cannot communicate, they can generally both assume the Master controller role. The other controllers in the PCS 550 would then see two master controllers, but they cannot generally resolve this situation. Controller 2 562*a*2 and controller 3 562*b*1 can still use FTE to detect if the other device is operational, report/alarm the dual-master situation, and report/alarm the broken connections. The other controllers can also report/alarm the presence of a dual master situation.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. For example, disclosed aspects although generally described being applied to PCS's, can also be applied to other systems. In addition, while a particular feature may have been disclosed with respect to only one of several implementations, such feature may be combined with one or more other features of the other implementations as may be desired and advantageous for any given or particular application.

The invention claimed is:

1. A method of detecting problems in a communications network that utilizes a parallel redundancy protocol (PRP), where the communications network includes a first lane and a second lane and a plurality of electronic devices including a first device and at least a second device, the method comprising:

providing the first device and the second device each having a processor, a memory configured to support the PRP, and to implement a redundancy manager for implementing a receive processing flow for identifying a path fault in the communications network, the plurality of electronic devices each including a first port and at least a second port, a transmitter, and a receiver; the first device transmitting a frame pair comprising a first frame from the first port over the first lane and a second frame from the second port over the second lane, the first frame and the second frame both including a destination address, a source address, a payload, and a redundancy control trailer including a sequence counter that is incremented after the frame pair is transmitted, the second device receiving the frame pair over the first lane and the second lane and implementing the receive processing flow, comprising:

wherein when the first frame or the second frame is identified to be a redundant frame, removing the redundant frame, and comparing a first frame parameter to a second frame parameter that is different from the first frame parameter to identify when the path fault is present, wherein following the removing of the redundant frame only one of the first frame and the second frame is added to generate a unique frame count that is independent of the sequence counter, and wherein the first frame parameter comprises the unique frame count and the second frame parameter comprises a count of the redundant frames to determine whether there is a count difference, wherein the redundancy manager further implements a status check utilizing a protocol other than the PRP for identifying a plurality of the path faults, wherein the method further comprises:

the first device transmitting the frame pair as a port status frame pair comprising the first frame as a first port status frame including a status check of the first port over the first lane, and the second frame as a second port status frame including the status check of the second port over the second lane, and wherein the first port and the second port are allowed to cross over between the first lane and the second lane without being rejected by receiving logic implemented by the receiver;

wherein the second device receiving comprises receiving a first copy of the port status frame pair over the first lane and a second copy of the port status frame pair over the second lane, and implementing a port status availability matrix from the first and second copies of the port status frame pair, comprising:

wherein the first port status frame is the first frame parameter that is received over the first lane and the first port status frame is received over the second lane indicates a path availability from the first lane on the first device to the first and the second lanes on the second device, wherein the second port status frame is the second frame parameter is received over the first lane and the second port status frame received over the second lane indicates a path availability from second lane on first device to the first and the second lanes on the second device, and wherein the comparing comprises comparing the first port status frame received and second port status frame received to determine whether there is a difference to identify when the plurality of path fault is present.

2. The method of claim 1, further comprising responsive to the path fault, transmitting an alert message to at least one of an operator and a maintenance journal to enable corrective action be taken.

3. The method of claim 1, wherein the comparing comprises comparing the source address and the sequence counter in the first frame and in the second frame to determine the source address and a number of the sequence counter are both the same.

4. The method of claim 1, wherein the communications network is within a process control system (PCS) comprising at least one operator workstation, at least one process controller coupled to at least one input/output (I/O) module, the I/O module coupled to at least one field device that is coupled to at least one piece of processing equipment.

5. The method of claim 1, wherein the PRP comprises high-availability seamless redundancy (HSR) protocol, and wherein the plurality of electronic devices is arranged as a ring in the communications network.

6. The method of claim 1, wherein the count difference when determined to be increasing over time is used to identify when the path fault is present using a predetermined measurement period for the time.

7. An electronic device within a communications network that utilizes a parallel redundancy protocol (PRP), wherein the communications network includes a first lane and a second lane, and wherein there is at least one other of the electronic device in the communications network, the electronic device and the other electronic device each comprising:
 a first port and at least a second port;
 a processing circuit that includes or is associated with a PRP handler for constructing PRP frames and implementing PRP-related functions;
 a protocol stack for implementing different layers of packet-based communication;
 a memory and permanent storage each accessible by the processing circuit, and
 transmit and receive (TX/RX) circuitry configured for transmitting data packets constructed by the PRP handler in conjunction with the protocol stack, and for receiving the data packets for processing by the PRP handler and the protocol stack,
a redundancy manager realized in the memory for implementing a receive processing flow for identifying a path fault in the communications network;
 the processing circuit configured for implementing a method of detecting problems in the communications network, the method comprising:
  the other electronic device transmitting a frame pair comprising a first frame from the first port over the first lane and a second frame from the second port over the second lane, the first frame and the second frame both including a destination address, a source address, a payload, and a redundancy control trailer including a sequence counter that is incremented after the frame pair is transmitted,
  the electronic device receiving the frame pair over the first lane and the second lane and implementing the receive processing flow, comprising:
   wherein when the first frame or the second frame is identified to be a redundant frame, removing the redundant frame, and
   comparing a first frame parameter to a second frame parameter that is different from the first frame parameter to determine when the path fault is present,
   wherein following the removing of the redundant frame only one of the first frame and the second frame is added to generate a unique frame count that is independent of the sequence counter, and wherein the first frame parameter comprises the unique frame count and the second frame parameter comprises a count of the redundant frames to determine whether there is a count difference;
  wherein the redundancy manager further implements a status check utilizing a protocol other than the PRP for identifying a plurality of the path faults, wherein the method further comprises:
  the electronic device transmitting the frame pair as a port status frame pair comprising the first frame as a first port status frame including a status check of the first port over the first lane, and the second frame as a second port status frame including the status check of the second port over the second lane, and wherein the first port and the second port are allowed to cross over between the first lane and the second lane without being rejected by receiving logic implemented by the receiver;
  wherein the other electronic device receiving comprises receiving a first copy of the port status frame pair over the first lane and a second copy of the port status frame pair over the second lane, and implementing a port status availability matrix from the first and second copies of the port status frame pair, comprising:
  wherein the first port status frame is the first frame parameter that is received over the first lane and the first port status frame received over second lane indicates a path availability from the first lane on the electronic device to the first and the second lanes on the other electronic device,
  wherein the second port status frame is the second frame parameter received over the first lane and the second port status frame received over second lane indicates a path availability from second lane on the electronic device to the first and the second lanes on the other electronic device, and
  wherein the comparing comprises comparing the first port status frame received and the second port status frame received to determine whether there is a difference to identify when the plurality of path fault is present.

8. The electronic device of claim 7, wherein the electronic device and the other electronic device are each further configured to in responsive to the path fault, transmitting an alert message to at least one of an operator and a maintenance journal to enable corrective action be taken.

9. The electronic device of claim 7, wherein the communications network is within a process control system (PCS) comprising at least one operator workstation, at least one process controller coupled to at least one input/output (I/O) module, the I/O module coupled to at least one field device that is coupled to at least one piece of processing equipment.

10. The electronic device of claim 7, wherein the PRP comprises high-availability seamless redundancy (HSR) protocol, and wherein the electronic device and the other electronic device are arranged as a ring in the communications network.

11. The electronic device of claim 7, wherein the count difference when determined to be increasing over time is used to identify when the path fault is present using a predetermined measurement period for the time.

12. The electronic device of claim 7, wherein in the communications network, the PRP is used together with a fault tolerant Ethernet protocol.

* * * * *